H. G. CORDLEY.
DISPENSING DEVICE.
APPLICATION FILED SEPT. 19, 1916.
1,260,333.
Patented Mar. 26, 1918.
2 SHEETS—SHEET 1.
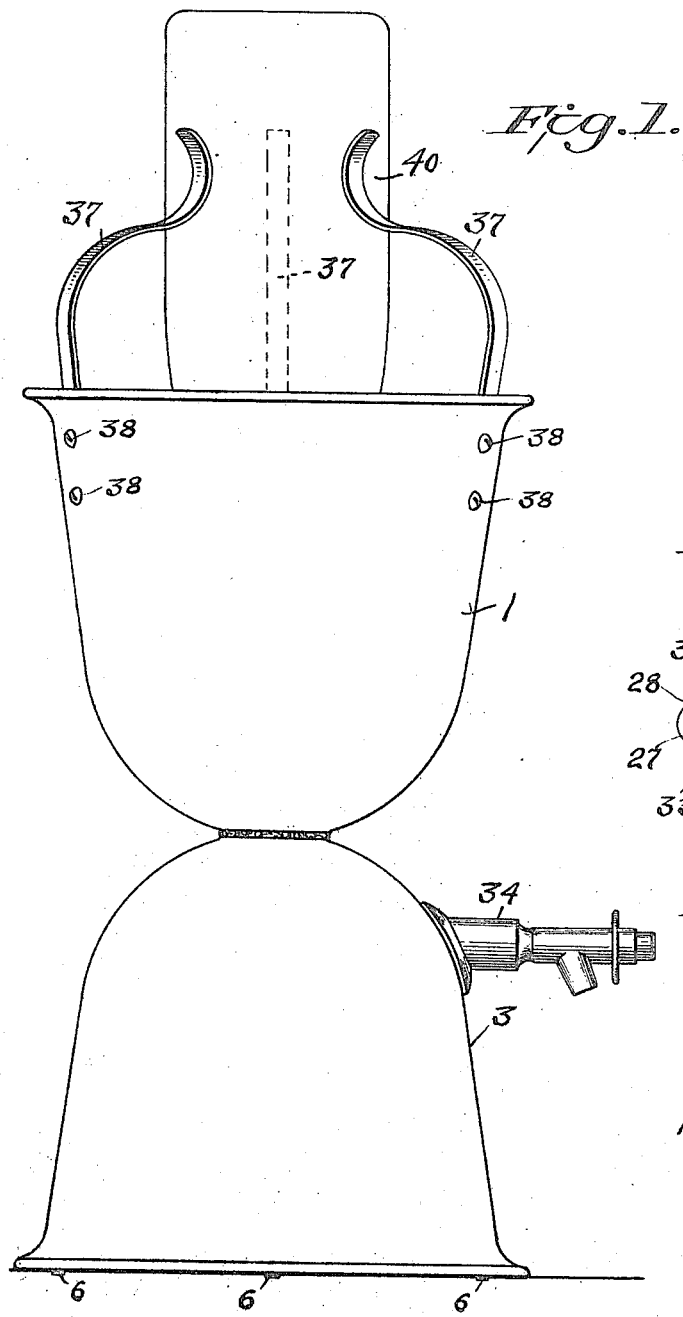
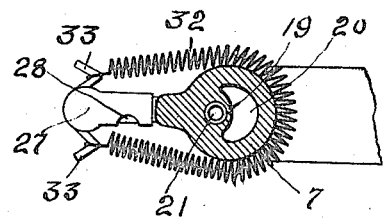
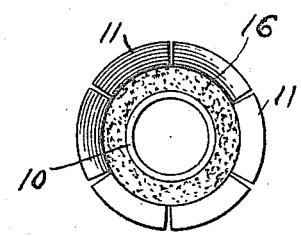
Inventor,
Henry G. Cordley.
By A. P. Greeley
Attorney

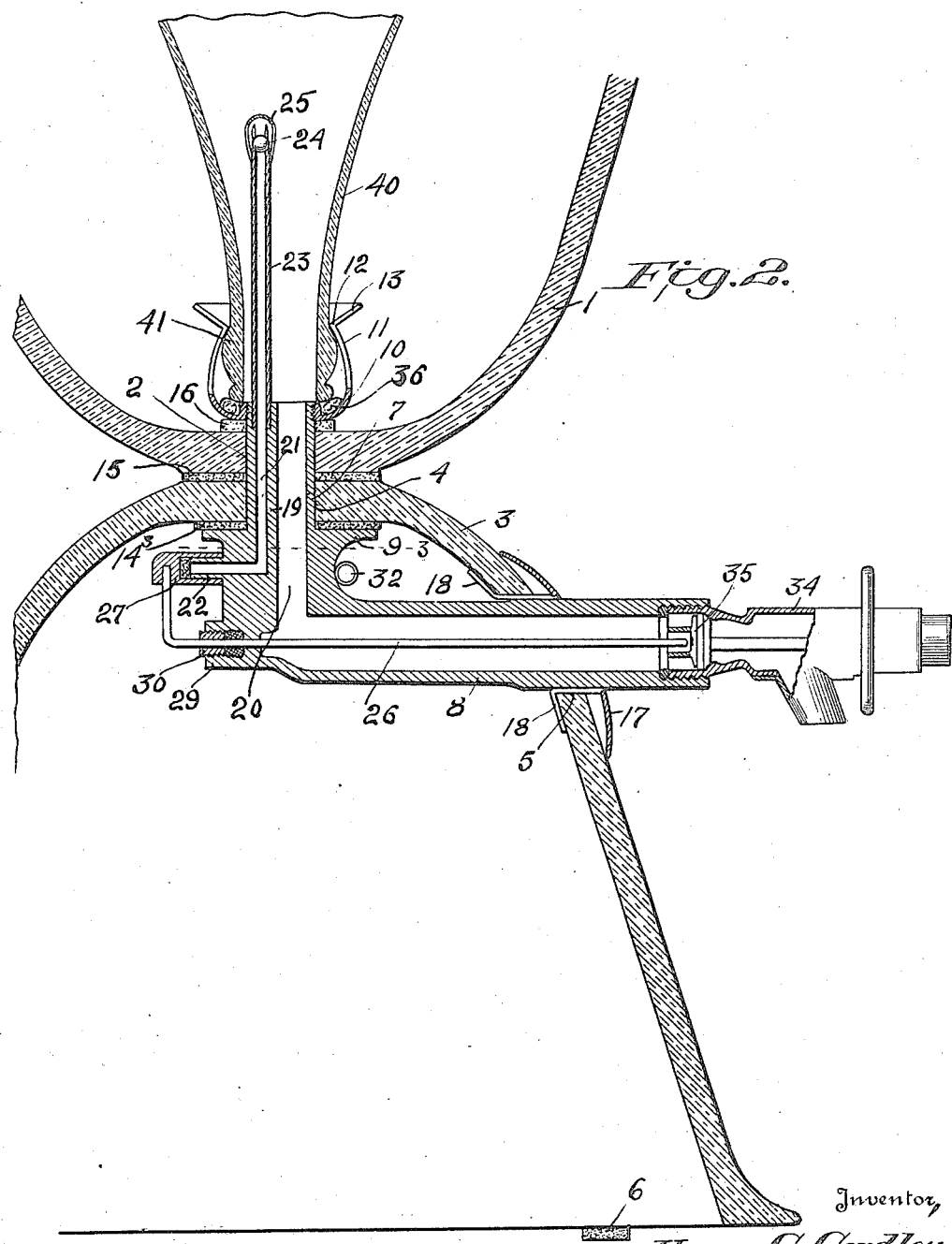

UNITED STATES PATENT OFFICE.

HENRY G. CORDLEY, OF GLEN RIDGE, NEW JERSEY.

DISPENSING DEVICE.

1,260,333.  Specification of Letters Patent. Patented Mar. 26, 1918.

Application filed September 19, 1916. Serial No. 121,021.

*To all whom it may concern:*

Be it known that I, HENRY G. CORDLEY, a citizen of the United States, residing at Glen Ridge, in the county of Essex, State of New Jersey, have invented certain new and useful Improvements in Dispensing Devices, of which the following is a description, reference being had to the accompanying drawings, forming a part hereof.

My invention relates to dispensing devices for serving or dispensing liquids such as grape juice or other beverages from the original bottles in which they are sold or from other bottles or containers and my invention has for its object to provide a device for this purpose so constructed that its principal parts may be made of non-metallic material such as porcelain or glass so held together as to prevent leakage and so that the beverage or other liquid to be dispensed will not come in contact with any material which will be corroded or discolored by it. A further object of the invention is to provide a device of this character which may be readily taken apart for cleaning and which will be adapted to be placed on a store counter and in which a fresh bottle may be readily substituted for one from which the contents have been drawn. A further object of the invention is to provide means for receiving the mouth of the bottle and holding it so as to prevent leakage which will permit a bottle to be readily inserted or removed.

With these and other objects hereinafter explained in view my invention consists in the construction and combination of elements hereinafter explained and particularly pointed out in the claims.

Referring to the drawings Figure 1 is an elevation of a complete dispenser embodying my invention; Fig. 2 is a vertical central sectional view of the operating parts of the dispenser shown in Fig. 1 on an enlarged scale.

Fig. 3 is a horizontal sectional view on line 3—3 of Fig. 2 and

Fig. 4 is a top plan view of the cup which receives the bottle mouth.

In the drawings 1 indicates a bowl shaped receptacle adapted to contain ice and having a central opening 2 in its bottom and preferably, though not necessarily, made of porcelain or other non-metallic material. 3 indicates a base for supporting the ice receptacle 1 here shown as substantially the same in shape as the ice receptacle 1 and having in its bottom a central opening 4 and having in its side an opening 5. This base 3 is like the ice receptacle though not necessarily made of porcelain or other non metallic material.

The base is preferably provided at its lower edge with pads 6 of rubber or other elastic material so as to avoid danger of scratching the surface of the table or store counter on which it may be placed.

The ice receptacle and the base are secured together by means of a hollow casting having vertical arm 7 and horizontal arm 8 the vertical arm having its upper end screwthreaded and having at its base a horizontal flange 9. In the assembled device the ice receptacle 1 is placed with its open end up and its bottom resting on the bottom of the base 3 which is arranged with its open end down, with the openings 2 and 4 in line with the vertical arm 7 of the casting extending upward from within the base up through the openings 4 and 2 into the ice receptacle. Onto the end of vertical arm 7 is screwed a cup 10 the bottom of which is made sufficiently thick to receive screwthreads and the sides of which are formed of sections 11 of relatively thin resilient metal slightly separated to permit of spring action. These sections 11 are bent inward near their upper ends as shown at 12 and then outward as shown at 13. The bottoms of the ice receptacle and base are thus clamped together between the flange 9 and the bottom of the cup 10. A washer 14 is preferably placed on flange 9 and a second washer 15 between the ice receptacle and the base. A washer 16 may be placed between the bottoms of cup 10 and the interior of the bottom of the ice receptacle.

The horizontal arm 8 extends outward through opening 5 in the side of the base and is preferably surrounded on the outside of the base by a shield 17 having securing arms 18 extending through the opening 5 about the horizontal arm 8 and bent outward within the interior of the base.

The vertical arm 7 of the casting is provided with an interior partition 19 by which it is divided into a relatively large liquid passage 20 and a relatively small air passage 21. The liquid passage 20 communicates at its base with the interior of horizontal arm 8. The air passage 21 communicates at its base with a small tube 22 open at its outer end and extending in a direction opposite to that in which the horizontal tube 8 extends. The air passage 21 is slightly enlarged at its upper end to receive the end of an air tube 23 the upper end of which is provided with a ball valve 24 held in place by a cage 25.

The casting at the rear end of the horizontal arm 8 is provided with an opening in line with the axis of the arm 8 through which extends a rod 26 the rear end of which is bent upward and is provided with a tubular cap 27 adapted to slide on the small tube 22 and provided in its side with an opening 28 so arranged that when the cap is in normal position the opening will be in line with the tube 22 but when the cap is pushed rearward the opening will be, in part at least, to the rear so as to permit air to enter. The casting is preferably provided with a rearwardly extending projection 29 which is bored out concentric with the opening through which rod 26 extends and screw threaded to receive a centrically perforated nut 30 adapted to press against suitable packing material so as to prevent leakage about the rod 26. A coiled spring 32 is arranged with its ends engaging hooks 33 on the tubular cap 27 and with its central portion extending around the vertical arm 7 beneath the flange 9, this spring serving to press the tubular cap toward the casting and thus close the end of tube 22.

The horizontal arm 8 of the casting is interiorly screwthreaded at its outer or forward end to receive the screwthreaded end of a push faucet 34 the valve 35 of which is coned out on its rear face to engage the forward end of the rod 26 so that when the valve is pushed rearward in the usual manner to open the valve, the rod 26 will be pushed rearward and caused to move the tubular cap 27 rearward against the force of spring 32 to permit air to enter tube 22.

The cup 10 is constructed to receive the mouth of a bottle 40 with the inwardly extending portion of the spring sections 11 engaging the collar 41 on the exterior of the bottle mouth. The cup 10 is preferably provided in its bottom about its screwthreaded opening with a gasket 36 against which the edge of the bottle mouth fits.

The ice receptacle is provided at its open end with a number of spring arms 37 held to the receptacle by bolts 38 and bent inward so as to bear against the sides of the bottle and hold it in position.

In use the bottle is opened by drawing its cork or removing its cap and the dispenser is then turned upside down and placed on the bottle with the air inlet tube 23 extending into the bottle and the mouth of the bottle fitting into the cup 10 into which it is pressed until the projections 12 spring over and engage the collar 41. The dispenser and bottle are then inverted so that the feet 6 of the base rest on the table or store counter and the ice receptacle is supplied with broken ice.

The contents of the bottle may then be drawn off as desired by pressing the button of the faucet, the inward movement of the valve 35 opening the liquid passage and by its action on the rod 26 causing the air passage to be opened to permit air to enter the bottle as the liquid flows out. The ball valve 24 prevents any liquid from leaking out through the air passage.

The hollow member carrying the faucet in its horizontal arm and having its upper end provided with the cup which receives and retains the bottle neck may be used without the ice receptacle and with supporting means other than the base shown.

Having thus described my invention what I claim is—

1. A dispensing device comprising an ice receptacle and a base and means for holding them together consisting of a hollow member open at its upper end and adapted to receive a faucet at its outer end and having a shoulder adapted to bear against the top of the base and having a vertical portion screwthreaded at its upper end extending upward into the ice receptacle and a member fitting the screwthreaded end of said vertical portion.

2. A dispensing device comprising an ice receptacle and a base and means for holding them together consisting of a hollow member open at its upper end and adapted to receive a faucet at its outer end and having a shoulder adapted to bear against the top of the base and having a vertical portion extending upward into the ice receptacle and a cup adapted to receive and retain a bottle fitting and secured on the vertical portion of the hollow member.

3. In a dispensing device, an ice receptacle, a base, a hollow member open at its upper end, having a shoulder adapted to bear against the top of the base, and extending through and securing the ice receptacle to the base and having a partition therein separating its interior into a liquid passage and an air passage, and means for controlling the liquid and air passages.

4. In a dispensing device, an ice receptacle, a base, a hollow member open at its upper end, having a shoulder adapted to bear against the top of the base and extending through and securing the ice receptacle to the base having a partition separating its interior into a liquid passage and an air passage, means for controlling the liquid and air passages, and a removable air inlet tube extending upward from the upper end of the air passage.

5. A dispensing device comprising an ice receptacle of non-metallic material having a central opening, a base adapted to support the ice receptacle and means for clamping the ice receptacle to the base comprising a hollow screwthreaded member having a shoulder bearing against the top of the base and extending upward from the base through the central opening in the ice receptacle and provided within the ice receptacle with a clamping member fitting the screwthreads.

6. A dispensing device comprising a bowl shaped ice receptacle having a central opening, a bowl shaped base having a central opening and means for clamping the ice receptacle and base together comprising a hollow screwthreaded member having a shoulder bearing against the top of the base and extending through the central opening in the ice receptacle and base and a clamping member fitting the screwthreaded member.

7. In a dispensing device, an ice receptacle having a central opening therein, a hollow member extending through the central opening and a cup fitting the upper end adapted to be secured thereon comprising resilient sections adapted to engage the neck of a bottle.

8. In a dispensing device an ice receptacle and a base and means for securing the ice receptacle and base together comprising a member having a horizontal portion and a vertical portion having a shoulder on the vertical portion adapted to bear against the top of the base, and extending into the ice receptacle, a partition separating the vertical portion into a liquid passage and an air passage, a push faucet on the outer end of the horizontal portion, a rod extending through the horizontal portion adapted to be operated by the valve of the faucet, and a valve carried by said rod for controlling the inlet to the air passage.

9. In a dispensing device an ice receptacle and a base and means for securing the ice receptacle and base together comprising a member having a horizontal portion and a vertical portion having a shoulder on the vertical portion adapted to bear against the top of the base, and extending into the ice receptacle, a partition separating the vertical portion into a liquid passage and an air passage, a push faucet on the outer end of the horizontal portion, a rod extending through the horizontal portion adapted to be operated by the valve of the faucet, and a valve carried by said rod for controlling the inlet to the air passage and a spring for holding the valve normally closed.

10. In a dispensing device, a hollow member having a horizontal arm and a vertical arm, a faucet carried by the horizontal arm and a cup carried by the vertical arm having resilient sections adapted to engage the neck of a bottle, and means for supporting the hollow member.

This specification signed this 26th day of June A. D. 1916.

HENRY G. CORDLEY.

Copies of this patent may be obtained for five cents each, by addressing the "Commissioner of Patents, Washington, D. C."